United States Patent
Tang

(10) Patent No.: US 10,873,378 B2
(45) Date of Patent: Dec. 22, 2020

(54) METHOD AND DEVICE FOR TRANSMITTING UPLINK SIGNALS

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/475,595

(22) PCT Filed: Jan. 23, 2017

(86) PCT No.: PCT/CN2017/072285
§ 371 (c)(1),
(2) Date: Jul. 2, 2019

(87) PCT Pub. No.: WO2018/133124
PCT Pub. Date: Jul. 26, 2018

(65) Prior Publication Data
US 2019/0356369 A1  Nov. 21, 2019

(51) Int. Cl.
*H04L 5/00* (2006.01)
*H04B 7/06* (2006.01)
(Continued)

(52) U.S. Cl.
CPC ......... *H04B 7/0617* (2013.01); *H04B 7/0456* (2013.01); *H04L 5/0051* (2013.01);
(Continued)

(58) Field of Classification Search
CPC ........... H04W 72/046; H04W 72/1289; H04W 74/0833; H04B 7/0617; H04B 7/0456;
(Continued)

(56) References Cited

U.S. PATENT DOCUMENTS

2010/0246457 A1* 9/2010 Zhou .................. H04L 25/0232
370/294
2016/0020837 A1* 1/2016 Schober ............... H04B 7/0469
375/267
(Continued)

FOREIGN PATENT DOCUMENTS

CN    101686110 A    3/2010
CN    101772168 A    7/2010
(Continued)

OTHER PUBLICATIONS

3GPP TSG RAN WG1 NR Ad Hoc Meeting Spokane, USA, Source, Huawei, HiSilicon, Title "UL SRS design for CSI acquisition and beam management", R1-1700074, date Jan. 16-20, 2017 (Year: 2017).*

(Continued)

*Primary Examiner* — Lan-Huong Truong

(57) ABSTRACT

A method and device for transmitting an uplink signal are provided. The method includes: determining, by a terminal device, a target downlink resource for transmitting a target downlink signal among a plurality of downlink resources; determining, by the terminal device, target uplink precoding information according to the target downlink resource and a predetermined corresponding relationship, wherein the predetermined corresponding relationship is a corresponding relationship between downlink resources and uplink pre-coding information; and transmitting, by the terminal device, an uplink signal according to the target uplink pre-coding information.

17 Claims, 4 Drawing Sheets

(51) Int. Cl.
  *H04B 7/0456* (2017.01)
  *H04L 25/02* (2006.01)
  *H04W 72/04* (2009.01)
  *H04W 72/12* (2009.01)
  *H04W 74/08* (2009.01)

(52) U.S. Cl.
  CPC ....... *H04L 25/0226* (2013.01); *H04W 72/046* (2013.01); *H04W 72/1289* (2013.01); *H04W 74/0833* (2013.01)

(58) Field of Classification Search
  CPC ... H04B 7/0413; H04B 7/0404; H04L 5/0051; H04L 25/0226
  See application file for complete search history.

(56) References Cited

U.S. PATENT DOCUMENTS

2016/0359536 A1* 12/2016 Guo .................. H04W 72/0413
2017/0155434 A1*  6/2017 Kim .................... H04B 7/0456

FOREIGN PATENT DOCUMENTS

| CN | 101873205 A | 10/2010 |
| CN | 101932025 A | 12/2010 |
| CN | 102065434 A | 5/2011 |
| CN | 102438304 A | 5/2012 |
| CN | 102469489 A | 5/2012 |
| CN | 103702429 A | 4/2014 |
| CN | 103703802 A | 4/2014 |
| CN | 104365126 A | 2/2015 |
| CN | 104579585 A | 4/2015 |
| CN | 104734763 A | 6/2015 |
| EP | 3525504 A1 | 8/2019 |
| RU | 2450456 C2 | 5/2012 |
| RU | 2577318 C2 | 3/2016 |
| RU | 2608580 C1 | 1/2017 |
| SG | 11201903783 S | 5/2019 |
| WO | 2011053220 A1 | 5/2011 |

OTHER PUBLICATIONS

Extended EP Search Report for EP application 17892245 filed Oct. 14, 2019.
XP051207614; 3GPP TSG RAN WG1 NR Ad Hoc Meeting; Spokane, USA, Jan. 16-20, 2017.
XP051207616; 3GPP TSG RAN WG1 NR Ad Hoc Meeting Spokane, USA, Jan. 16-20, 2017.
English translation of RU Decision on Grant for RU application 2019125584/08 dated Mar. 26, 2020.
English translation of CN first office action for CN application 201780083715.X dated May 12, 2020.
EP Examination Communication for EP 17892245.6 dated Apr. 14, 2020.
English translation of China Second Office Action for CN Application 201780083715.X dated Aug. 17, 2020.
Canada Office Action for corresponding Application 3051010 dated Sep. 4, 2020.
Invitation to Response to Written Opinion for SG Application 11201906629X dated Jul. 6, 2020.
Decision of Refusal and English Translation of CN Application 201780083715 dated Oct. 10, 2020.
EP Examination Report for EP Application 17892245.6 dated Oct. 21, 2020.

* cited by examiner

100

| A terminal device determines a target downlink resource for transmitting a target downlink signal among a plurality of downlink resources | ~ S110 |

| The terminal device determines target uplink pre-coding information according to the target downlink resource and a predetermined corresponding relationship, wherein the predetermined corresponding relationship is a corresponding relationship between downlink resources and uplink pre-coding information | ~ S120 |

| The terminal device transmits an uplink signal according to the target uplink pre-coding information | ~ S130 |

| A network device sends a target downlink signal to a terminal device on a target downlink resource among a plurality of downlink resources | ~ S210 |

| The network device receives an uplink signal sent by the terminal device according to target uplink pre-coding information, wherein the target uplink pre-coding information is determined by the terminal device according to the target downlink resource and a predetermined corresponding relationship, and the predetermined corresponding relationship is a corresponding relationship between downlink resources and uplink pre-coding information | ~ S220 |

A network device receives a plurality of uplink sounding signals sent by a terminal device, wherein the plurality of uplink sounding signals include a target uplink sounding signal, and the plurality of uplink sounding signals have a corresponding relationship with a plurality of downlink resources — S230

The network device determines the target uplink sounding signal — S240

The network device determines a target downlink resource according to the target uplink sounding signal — S250

The network device sends a target downlink signal to the terminal device on the target downlink resource among the plurality of downlink resources — S210

The network device receives an uplink signal sent by the terminal device according to target uplink pre-coding information, wherein the target uplink pre-coding information is determined by the terminal device according to the target downlink resource and a predetermined corresponding relationship, and the predetermined corresponding relationship is a corresponding relationship between downlink resources and uplink pre-coding information — S220

FIG. 3

METHOD AND DEVICE FOR TRANSMITTING UPLINK SIGNALS

CROSS-REFERENCE TO RELATED APPLICATION(S)

This application is a 371 application of International Application No. PCT/CN2017/072285, filed on Jan. 23, 2017, the entire disclosure of which is hereby incorporated by reference.

TECHNICAL FIELD

Implementations of the present application relate to the field of communication, and more particularly, to a method and device for transmitting an uplink signal.

BACKGROUND

In a New Radio communication system, uplink transmission may obtain a forming gain or a pre-coding gain through analog beamforming or digital pre-coding. The analog beamforming is generally performed on analog signals, and an uplink transmission beam needs to be determined through beam training. For example, a terminal device transmits signals of multiple different beams, and a network side indicates the best signal among the signals of multiple different beams to the terminal device. A digital pre-coding matrix is generally obtained by the network side through uplink channel information and notified to the terminal device, while the uplink channel information is generally obtained through a Sounding Reference Signal (SRS).

In the related art, an uplink pre-coding matrix is usually divided into two parts: a wideband pre-coding matrix and a narrowband pre-coding matrix, wherein the wideband pre-coding matrix changes slowly while the narrowband pre-coding matrix changes rapidly, so the narrowband pre-coding matrix is generally transmitted together with Downlink Control Information (DCI) of scheduling data. However, since an analog beam and a wideband pre-coding matrix used by the terminal device for uplink transmission generally change slowly, if corresponding indication information is transmitted in the DCI of the scheduling data, a large control signaling overhead is required.

SUMMARY

The present application provides a method and device for transmitting an uplink signal.

In a first aspect, there is provided a method for transmitting an uplink signal, including: determining, by a terminal device, a target downlink resource for transmitting a target downlink signal among a plurality of downlink resources; determining, by the terminal device, target uplink pre-coding information according to the target downlink resource and a predetermined corresponding relationship, wherein the predetermined corresponding relationship is a corresponding relationship between downlink resources and uplink pre-coding information; and transmitting, by the terminal device, an uplink signal according to the target uplink pre-coding information.

In combination with the first aspect, in one implementation of the first aspect, the target uplink pre-coding information is used for indicating a target uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

In combination with the first aspect and the implementation thereof, in another implementation of the first aspect, the target uplink pre-coding information is used for indicating a target uplink wideband pre-coding matrix; wherein the transmitting, by the terminal device, the uplink signal according to the target uplink pre-coding information, includes: performing, by the terminal device, a wideband pre-coding processing on the uplink signal according to the target uplink wideband pre-coding matrix to obtain a pre-coded uplink signal; and transmitting, by the terminal device, the pre-coded uplink signal.

In combination with the first aspect and the implementation thereof, in another implementation of the first aspect, the target uplink pre-coding information is used for indicating a target uplink beam; wherein the transmitting, by the terminal device, the uplink signal according to the target uplink pre-coding information, includes: performing, by the terminal device, a beamforming processing on the uplink signal according to the target uplink beam to obtain a beamformed uplink signal; and performing, by the terminal device, the beamformed uplink signal.

In combination with the first aspect and the implementation thereof, in another implementation of the first aspect, the target uplink pre-coding information is used for indicating a target uplink sounding signal; wherein the transmitting, by the terminal device, the uplink signal according to the target uplink pre-coding information, includes: determining, by the terminal device, a beam used in transmitting the target uplink sounding signal as the target uplink beam; performing, by the terminal device, a beamforming processing on the uplink signal according to the target uplink beam to obtain a beamformed uplink signal; and performing, by the terminal device, the beamformed uplink signal.

In combination with the first aspect and the implementation thereof, in another implementation of the first aspect, the target uplink pre-coding information is used for indicating a target uplink sounding signal; wherein before the terminal device determines the target downlink resource for transmitting the target downlink signal among the plurality of downlink resources, the method further includes: sending, by the terminal device, a plurality of uplink sounding signals to a network device, wherein the plurality of uplink sounding signals include the target uplink sounding signal, and the plurality of uplink sounding signals have a corresponding relationship with the plurality of downlink resources.

In combination with the first aspect and the implementation thereof, in another implementation of the first aspect, the determining, by the terminal device, the target downlink resource for transmitting the target downlink signal among the plurality of downlink resources, includes: receiving, by the terminal device, resource configuration information sent by a network device, wherein the resource configuration information is used for indicating the target downlink resource; determining, by the terminal device, the target downlink resource according to the resource configuration information; or, determining, by the terminal device, a downlink resource where the target downlink signal is detected among the plurality of downlink resources as the target downlink resource.

In combination with the first aspect and the implementation thereof, in another implementation of the first aspect, the target downlink signal is one of the following signals: a downlink control channel, a downlink random access response signal, a downlink data channel, and a downlink reference signal.

In combination with the first aspect and the implementation, in another implementation of the first aspect, each downlink resource is a time domain resource; or, each downlink resource is a frequency domain resource, or each downlink resource is a code resource.

In a second aspect, there is provided a method for transmitting an uplink signal, including: sending, by a network device, a target downlink signal to a terminal device on a target downlink resource among a plurality of downlink resources; receiving, by the network device, an uplink signal sent by the terminal device according to target uplink pre-coding information, wherein the target uplink pre-coding information is determined by the terminal device according to the target downlink resource and a predetermined corresponding relationship, and the predetermined corresponding relationship is a corresponding relationship between downlink resources and uplink pre-coding information.

In combination with the second aspect, in one implementation of the second aspect, the target uplink pre-coding information is used for indicating an uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

In combination with the second aspect and the implementation thereof, in another implementation of the second aspect, the target uplink pre-coding information is used for indicating the target uplink sounding signal, and the method further includes: receiving, by the network device, a plurality of uplink sounding signals sent by the terminal device, wherein the plurality of uplink sounding signals include the target uplink sounding signal, and the plurality of uplink sounding signals have a corresponding relationship with the plurality of downlink resources; determining, by the network device, the target uplink sounding signal; and determining, by the network device, the target downlink resource according to the target uplink sounding signal.

In combination with the second aspect and the implementation thereof, in another implementation of the second aspect, the method further includes: sending, by the network device, resource configuration information to the terminal device, wherein the resource configuration information is used for indicating the target downlink resource.

In combination with the second aspect and the above-described implementation thereof, in another implementation of the second aspect, the target downlink signal is one of the following signals: a downlink control channel, a downlink random access response signal, a downlink data channel, and a downlink reference signal.

In combination with the second aspect and the implementation thereof, in another implementation of the second aspect, each downlink resource is a time domain resource; or, each downlink resource is a frequency domain resource, or each downlink resource is a code resource.

In a third aspect, a terminal device is provided. The terminal device is used for performing the method in the first aspect or any possible implementation of the first aspect. Specifically, the terminal device includes function modules used for executing the method in the first aspect or any possible implementation of the first aspect.

In a fourth aspect, a network device is provided. The network device is used for performing the method in the second aspect or any possible implementation of the second aspect. Specifically, the network device includes function modules for executing the method in the second aspect or any possible implementation of the second aspect.

In a fifth aspect, a terminal device is provided. The terminal device includes a processor, a memory, and a transceiver. The processor, the memory, and the transceiver communicate with each other through internal connection paths to transfer control and/or data signals so that the terminal device executes the method in the first aspect or any possible implementation of the first aspect.

In a sixth aspect, a network device is provided. The network device includes a processor, a memory, and a transceiver. The processor, the memory, and the transceiver communicate with each other through internal connection paths to transfer control and/or data signals so that the network device executes the method in the second aspect or any possible implementation of the second aspect.

In a seventh aspect, a computer readable medium is provided for storing a computer program. The computer program includes instructions used for executing the first aspect or any possible implementation of the first aspect.

In an eighth aspect, a computer readable medium is provided for storing a computer program. The computer program includes instructions used for executing the second aspect or any possible implementation of the second aspect.

BRIEF DESCRIPTION OF DRAWINGS

FIG. 1 is a schematic flow chart of a method for transmitting an uplink signal according to an implementation of the present application.

FIG. 2 is a schematic flow chart of a method for transmitting an uplink signal according to another implementation of the present application.

FIG. 3 is another schematic flow chart of a method for transmitting an uplink signal according to another implementation of the present application.

DETAILED DESCRIPTION

Figure 4:
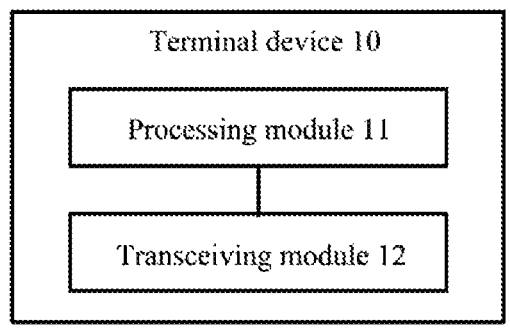
FIG. 4 is a schematic block diagram of a terminal device according to an implementation of the present application.

Technical solutions of the implementations of the present application will be clearly and completely described below with reference to the drawings in the implementations of the present application.

It should be understood that technical solutions of the implementations of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a long term evolution (LTE)

system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a 5G system, or a New Radio (NR) system.

In the implementations of the present application, a terminal device may include, but is not limited to, a Mobile Station (MS), a mobile terminal, a mobile telephone, a User device (UE), a handset, a portable equipment, a vehicle, and so on. The terminal device may communicate with one or more core networks through a radio access network (RAN). For example, the terminal device may be a mobile telephone (or referred to as a "cellular" phone), or a computer with wireless communication function. The terminal device may be a mobile apparatus that is portable, pocket-sized, hand-held, built in a computer, or mounted on a vehicle.

The network device involved in the implementation of the present application is an apparatus deployed in a wireless access network to provide wireless communication functions for a terminal device. The network device may be a base station, which may include various forms of macro base stations, micro base stations, relay stations, access points, etc. In systems adopting different radio access technologies, names of devices with functionality of a base station may be different. For example, it is called Evolved NodeB (eNB or eNodeB) in a LTE network, and it is called Node B in a 3rd Generation (3G) network.

It should be noted that in the implementation of the present application, uplink transmission refers to a process in which a terminal device sends a signal to a network device, and downlink transmission refers to a process in which a network device sends a signal to a terminal device. A downlink resource refers to a resource used by a network device to send a downlink signal to a terminal device.

It should also be noted that in the implementation of the present application, an uplink wideband pre-coding matrix is a pre-coding matrix used for pre-coding by a terminal device on all physical resources in a transmission bandwidth. A terminal device may obtain a pre-coding matrix corresponding to each sub-band according to an uplink wideband pre-coding matrix and a sub-band pre-coding matrix.

FIG. 1 shows a method for transmitting an uplink signal according to an implementation of the present application. As shown in FIG. 1, the method 100 includes acts S110-S130.

In S110, a terminal device determines a target downlink resource for transmitting a target downlink signal among a plurality of downlink resources.

In S120, the terminal device determines target uplink pre-coding information according to the target downlink resource and a predetermined corresponding relationship, wherein the predetermined corresponding relationship is a corresponding relationship between downlink resources and uplink pre-coding information.

In S130, the terminal device transmits an uplink signal according to the target uplink pre-coding information.

It should be noted that the downlink resources in the method 100 may be time domain resources. For example, the time domain resources may be subframes, or the time domain resources may be time slots, or the time domain resources may be mini time slots, or the time domain resources may be orthogonal frequency division multiplexing (OFDM) symbols. The downlink resources in the method 100 may be frequency domain resources. For example, the frequency domain resources may be Physical Resource Blocks (PRB), or the frequency domain resources may be subcarriers, or the frequency domain resources may be sub-bands. The downlink resources in method 100 may be code resources. For example, the code resources may be root sequences, or the code resources may be cyclic shifts of sequences, or the code resources may be orthogonal codes (e.g., orthogonal coverage codes).

It could be understood that all the plurality of downlink resources can be used for transmitting the target downlink signal, but currently only the target downlink resource actually transmits the target downlink signal.

In the implementation of the present application, optionally, the target downlink signal is one of the following signals: a downlink control channel, a downlink random access response signal, a downlink data channel, and a downlink reference signal. For example, the downlink control channel is used for carrying DCI for terminal-specific search space transmission. Or, the downlink reference signal is a channel state information reference signal (CSI-RS) or a beam-specific signal (BRS), or a demodulation reference signal (DMRS).

In the implementation of the present application, the predetermined corresponding relationship is a corresponding relationship between downlink resources and uplink pre-coding information, which may be understood as a corresponding relationship between the plurality of downlink resources and different uplink pre-coding information. Herein, different uplink pre-coding information indicates different uplink wideband pre-coding matrices, or different uplink beams, or different uplink sounding signals. For example, different random access response resources correspond to different uplink beams, or different control channel resources correspond to different uplink wideband pre-coding matrices, or different downlink reference signal resources correspond to different uplink sounding signals.

Optionally, in S110, the terminal device may blindly detect the target downlink signal and determine a downlink resource where the target downlink signal is detected as the target downlink resource. For example, a network device preconfigures a plurality of control channel resources, a terminal device performs blind detection of target Downlink Control Information (DCI) on the plurality of control channel resources, and determines a control channel resource, on which the target DCI is detected, as the target downlink resource. The DCI is a DCI transmitted through a terminal-specific search space, such as DCI for scheduling data transmission. Or, a terminal device may determine the target downlink resource by blind detection for a downlink reference signal sequence. For example, the terminal device blindly detects a plurality of possible downlink sequences and takes a blindly detected downlink sequence as the target downlink resource.

Or, optionally, a network device indicates a target downlink resource by sending resource configuration information to a terminal device, and the terminal device determines the target downlink resource according to the indication of the configuration information after receiving the resource configuration information. For example, a network device sends a Radio Resource Control (RRC) signaling to a terminal device, which carries resource configuration information. Or a network device sends a physical layer signaling to a terminal device, and the physical layer signaling carries resource configuration information.

In the implementation of the present application, optionally, target uplink pre-coding information is used for indicating a target uplink wideband pre-coding matrix. For example, target uplink pre-coding information may directly indicate a target uplink wideband pre-coding matrix, or target uplink pre-coding information may be used for indicating an index of a target uplink wideband pre-coding matrix in a predetermined plurality of uplink wideband pre-coding matrices, and a terminal device may determine the target uplink wideband pre-coding matrix from the predetermined plurality of uplink wideband pre-coding matrices according to the index.

Furthermore, a terminal device performs a wideband pre-coding processing on an uplink signal according to a target uplink wideband pre-coding matrix to obtain a pre-coded uplink signal, and then the terminal device sends the pre-coded uplink signal to a network device.

Specifically, in some implementations, when a terminal device performs a wideband pre-coding processing on an uplink signal according to a target uplink wideband pre-coding matrix, the terminal device may obtain an actually used pre-coding matrix for each sub-band according to the target uplink wideband pre-coding matrix in combination with a sub-band pre-coding matrix obtained through DCI, thereby performing a pre-coding processing on an uplink signal on each sub-band.

In the implementation of the present application, optionally, target uplink pre-coding information is used for indicating a target uplink beam. For example, target uplink pre-coding information may directly indicate a target uplink beam, or target uplink pre-coding information may be used for indicating an index of a target uplink beam in a predetermined plurality of uplink beams, and a terminal device may determine the target uplink beam from the predetermined plurality of uplink beams according to the index. The predetermined plurality of uplink beams may be determined by the terminal device and reported to a network device, or the predetermined plurality of uplink beams may be previously indicated to the terminal device by the network device through a downlink signaling.

Furthermore, the terminal device performs beamforming on an uplink signal according to the determined target uplink beam to obtain a beamformed uplink signal, and then the terminal device sends the beamformed uplink signal to the network device.

Specifically, in some implementations, a terminal device determines a weight of beamforming according to a target uplink beam, and performs beamforming based on the weight of beamforming. Beam-forming here refers to analog beamforming, that is, a generated analog signal is phase shifted at a transmitting end according to a weight of beamforming to obtain a transmission signal, or beamforming may be understood as weighting based on an analog signal.

In the implementation of the present application, optionally, target uplink pre-coding information is used for indicating a target uplink sounding signal, and the target uplink sounding signal is used for a terminal device to determine a target uplink wideband pre-coding matrix or a target uplink beam. For example, target uplink pre-coding information indicates an index of a target uplink sounding signal in a plurality of uplink sounding signals, and a terminal device determines a target uplink sounding signal from the plurality of uplink sounding signals according to the index. Here the plurality of uplink sounding signals are uplink sounding signals sent by a terminal device to a network device for determining an uplink beam. The plurality of uplink sounding signals are beamformed through different beams, and after a terminal device determines a target uplink sounding signal according to an index, a beam adopted by the target uplink sounding signal may be determined as a target uplink beam so as to be used for beamforming of another uplink signal. A configuration of the plurality of uplink sounding signals may be indicated to a terminal device by a network device, and the network device instructs the terminal device to transmit an uplink sounding signal through a trigger signaling.

Or, it may be understood that a terminal device sends a plurality of uplink sounding signals beamformed by different beams to a network device, and the plurality of uplink sounding signals have a corresponding relationship with a plurality of downlink resources. The corresponding relationship here may be one uplink sounding signal corresponding to one downlink resource, one uplink sounding signal corresponding to multiple downlink resources, or multiple uplink sounding signals corresponding to one downlink resource. The corresponding relationship here may be a corresponding relationship pre-agreed between a network device and a terminal device, or a corresponding relationship indicated by a network device to a terminal device through a signaling. After receiving a plurality of uplink sounding signals, a network device determines a target uplink sounding signal from the plurality of uplink sounding signals, and determines a target downlink resource for transmitting a downlink signal according to the target uplink sounding signal. Correspondingly, a terminal device may determine a target uplink sounding signal according to a target downlink resource for transmitting the downlink signal. Optionally, a network device determines an uplink sounding signal with the best reception quality among the plurality of uplink sounding signals as the target uplink sounding signal.

Furthermore, a terminal device performs a beamforming processing on an uplink signal according to a beam used when transmitting a target uplink sounding signal to obtain a beamformed uplink signal, and then the terminal device transmits the beamformed uplink signal to a network device.

Specifically, in some implementations, a terminal device determines a weight of beamforming according to a beam used when transmitting a target uplink sounding signal, and performs beamforming on an uplink signal based on the weight of beamforming. Beam-forming here refers to analog beamforming, that is, a generated analog signal is phase shifted at a transmitting end according to a weight of beamforming to obtain a transmission signal, or beamforming may be understood as weighting based on an analog signal.

The method for transmitting an uplink signal according to the implementation of the present application is described in detail from a terminal device side above with reference to FIG. 1, and the method for transmitting an uplink signal according to the implementation of the present application will be described in detail from a network device side with reference to FIGS. 2 and 3. It should be understood that an interaction between a network device and a terminal device described by the network device side is the same as that described by the terminal device side, and relevant descriptions are omitted appropriately to avoid repetition.

FIG. 2 is a method for transmitting an uplink signal according to another implementation of the present application, as shown in FIG. 2, the method 200 includes acts S210-S220.

In S210, a network device sends a target downlink signal to a terminal device on a target downlink resource among a plurality of downlink resources.

In S220, the network device receives an uplink signal sent by the terminal device according to target uplink pre-coding information, wherein the target uplink pre-coding information is determined by the terminal device according to the target downlink resource and a predetermined corresponding relationship, and the predetermined corresponding relationship is a corresponding relationship between downlink resources and uplink pre-coding information.

According to the method for transmitting the uplink signal in the implementation of the present application, after a network device sends a target downlink signal to a terminal device on a target downlink resource, the network device receives an uplink signal sent by the terminal device according to uplink pre-coding information. Since the uplink pre-coding information is determined by the terminal device according to the target downlink resource and a predetermined relationship, the network device is not required to carry the uplink pre-coding information in a control signaling to send to the terminal device, and the signaling overhead may be reduced.

In the implementation of the present application, optionally, the target uplink pre-coding information is used for indicating an uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

In the implementation of the present application, optionally, as shown in FIG. 3, the target uplink pre-coding information is used for indicating a target uplink sounding signal, and the method further includes acts S230-S250.

In S230, a network device receives a plurality of uplink sounding signals sent by a terminal device, wherein the plurality of uplink sounding signals include a target uplink sounding signal, and the plurality of uplink sounding signals have a corresponding relationship with a plurality of downlink resources.

In S240, the network device determines the target uplink sounding signal.

In S250, the network device determines a target downlink resource according to the target uplink sounding signal.

In the implementation of the present application, optionally, the method further includes: the network device sends resource configuration information to the terminal device, wherein the resource configuration information is used for indicating the target downlink resource.

In the implementation of the present application, optionally, the target downlink signal is one of the following signals: a downlink control channel, a downlink random access response signal, a downlink data channel, and a downlink reference signal.

In the implementation of the present application, optionally, each downlink resource is a time domain resource; or, each downlink resource is a frequency domain resource, or, each downlink resource is a code resource.

The method for transmitting uplink signals according to the implementation of the present application has been described in detail above with reference to FIGS. 1 to 3. A terminal device according to the implementation of the present application will be described in detail below with reference to FIG. 4. As shown in FIG. 4, the terminal device 10 includes a processing module 11 and a transceiving module 12.

The processing module 11 is used for determining a target downlink resource for transmitting a target downlink signal among a plurality of downlink resources.

The processing module 11 is further used for determining target uplink pre-coding information according to the target downlink resource and a predetermined corresponding relationship, wherein the predetermined corresponding relationship is a corresponding relationship between downlink resources and uplink pre-coding information.

The transceiving module 12 is used for transmitting an uplink signal according to the target uplink pre-coding information.

Therefore, the terminal device according to the implementation of the present application determines the uplink pre-coding information according to the target downlink resources for transmitting the target downlink signal and the predetermined corresponding relationship, and transmits the uplink signal according to the uplink pre-coding information. Therefore, a network device is not required to carry the uplink pre-coding information in a control signaling to send to the terminal device, and the signaling overhead may be reduced.

In the implementation of the present application, optionally, the target uplink pre-coding information is used for indicating a target uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

In the implementation of the present application, optionally, the target uplink pre-coding information is used for indicating a target uplink wideband pre-coding matrix. Herein, the processing module 11 is further used for performing a wideband pre-coding processing on the uplink signal according to the target uplink wideband pre-coding matrix to obtain a pre-coded uplink signal. The transceiving module 12 is specifically used for transmitting the pre-coded uplink signal.

In the implementation of the present application, optionally, the target uplink pre-coding information is used for indicating a target uplink beam. Herein, the processing module 11 is further used for performing a beamforming processing on the uplink signal according to the target uplink beam to obtain a beamformed uplink signal. The transceiving module 12 is specifically used for transmitting the beamformed uplink signal.

In the implementation of the present application, optionally, the uplink pre-coding information is used for indicating a target uplink sounding signal. Herein, the processing module 11 is further used for determining a beam used when transmitting the target sounding signal as the target uplink beam; and performing a beamforming processing on the uplink signal according to the target uplink beam to obtain a beamformed uplink signal. The transceiving module 12 is specifically used for transmitting the beamformed uplink signal.

In the implementation of the present application, optionally, the target uplink pre-coding information is used for indicating a target uplink sounding signal. Herein, before the processing module 11 determines the target downlink resource for transmitting the target downlink signal among the plurality of downlink resources, the transceiving module 12 is further used for sending a plurality of uplink sounding signals to a network device, wherein the plurality of uplink sounding signals include the target uplink sounding signal, and the plurality of uplink sounding signals have a corresponding relationship with the plurality of downlink resources.

In the implementation of the present application, the transceiving module 12 is optionally further used for receiving resource configuration information sent by a network device, and the resource configuration information is used for indicating the target downlink resource.

The processing module 11 is specifically used for determining the target downlink resource according to the resource configuration information; or, the processing module 11 is specifically used for determining a downlink resource, where the target downlink signal is detected, among the plurality of downlink resources as the target downlink resource.

In the implementation of the present application, optionally, the target downlink signal is one of the following signals: a downlink control channel, a downlink random access response signal, a downlink data channel, and a downlink reference signal.

In the implementation of the present application, optionally, each downlink resource is a time domain resource; or, each downlink resource is a frequency domain resource, or, each downlink resource is a code resource.

The terminal device according to the implementation of the present application may refer to a flow of the method 100 corresponding to the implementation of the present application, and various units/modules in the terminal device and the other operations and/or functions are respectively in order to realize the corresponding flow in the method 100, and will not be repeated here for brevity.

Figure 5:
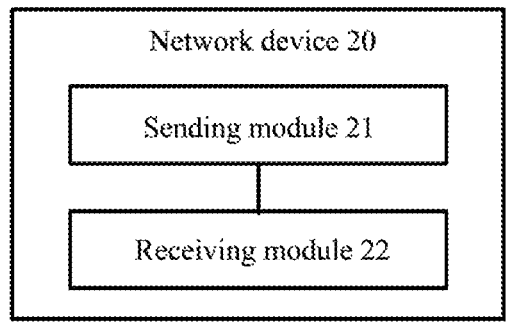
FIG. 5 is a schematic block diagram of a network device according to an implementation of the present application.

FIG. 5 shows a network device according to an implementation of the present application, as shown in FIG. 5, the network device 20 includes a sending module 21 and a receiving module 22.

The sending module 21 is used for sending a target downlink signal to a terminal device on a target downlink resource among a plurality of downlink resources.

The receiving module 22 is used for receiving an uplink signal sent by the terminal device according to target uplink pre-coding information, wherein the target uplink pre-coding information is determined by the terminal device according to the target downlink resource and a predetermined corresponding relationship, and the predetermined corresponding relationship is a corresponding relationship between downlink resources and uplink pre-coding information.

Therefore, after the network device according to the implementation of the present application sends a target downlink signal to a terminal device on a target downlink resource, the network device receives an uplink signal sent by the terminal device according to uplink pre-coding information. Since the uplink pre-coding information is determined by the terminal device according to the target downlink resource and a predetermined relationship, the network device is not required to carry the uplink pre-coding information in a control signaling to send to the terminal device, and the signaling overhead may be reduced.

In the implementation of the present application, optionally, the target uplink pre-coding information is used for indicating an uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

Figure 6:
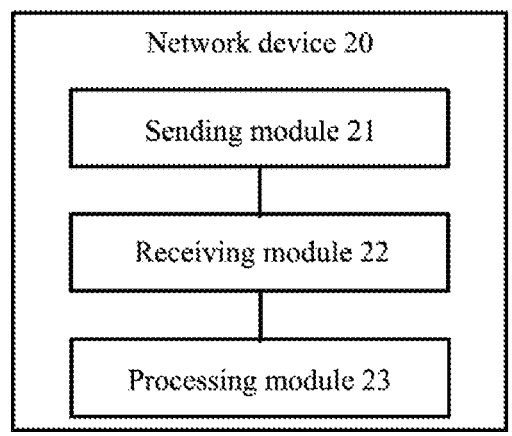
FIG. 6 is another schematic block diagram of a network device according to an implementation of the present application.

In the implementation of the present application, optionally, as shown in FIG. 6, the network device further includes a processing module 23, wherein the target uplink pre-coding information is used for indicating a target uplink sounding signal, and the receiving module 21 is further used for receiving a plurality of uplink sounding signals sent by the terminal device, wherein the plurality of uplink sounding signals include the target uplink sounding signal, and the plurality of uplink sounding signals have a corresponding relationship with the plurality of downlink resources.

The processing module 23 is used for determining the target uplink sounding signal.

The processing module 23 is further used for determining the target downlink resource according to the target uplink sounding signal.

In the implementation of the present application, optionally, the sending module 22 is further used for sending resource configuration information to the terminal device, wherein the resource configuration information is used for indicating the target downlink resource.

In the implementation of the present application, optionally, the target downlink signal is one of the following signals: a downlink control channel, a downlink random access response signal, a downlink data channel, and a downlink reference signal.

In the implementation of the present application, optionally, each downlink resource is a time domain resource; or, each downlink resource is a frequency domain resource, or, each downlink resource is a code resource.

The network device according to the implementation of the present application may refer to a flow of the method 200 corresponding to the implementation of the present application, and various units/modules in the network device and the other operations and/or functions are respectively in order to realize the corresponding flow in the method 200, and will not be repeated here for brevity.

Figure 7:
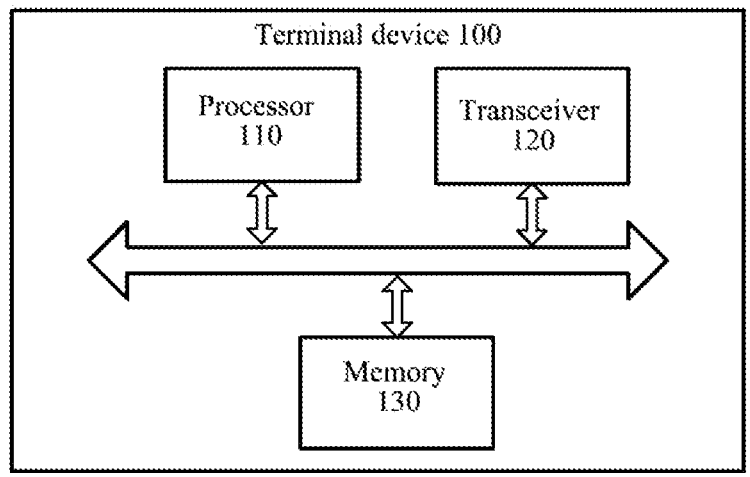
FIG. 7 is a schematic block diagram of a terminal device according to another implementation of the present application.

FIG. 7 is a block diagram of a terminal device according to another implementation of the present application. As shown in FIG. 7, a terminal device 100 comprises a processor 110 and a transceiver 120. The processor 110 is connected to the transceiver 120. Optionally, the terminal device 100 further includes a memory 130. The memory 130 is connected to the processor 110. Herein, the processor 110, the memory 130, and the transceiver 120 may communicate with each other through an internal connection path. Herein, the processor 110 is used for determining a target downlink resource for transmitting a target downlink signal among a plurality of downlink resources; the processor 110 is further used for determining target uplink pre-coding information according to the target downlink resource and a predetermined corresponding relationship, wherein the predetermined corresponding relationship is a corresponding relationship between downlink resources and uplink pre-coding information; and the transceiver 120 is used for transmitting an uplink signal according to the target uplink pre-coding information.

Therefore, the terminal device according to the implementation of the present application determines uplink pre-coding information according to a target downlink resource for transmitting a target downlink signal and a predetermined corresponding relationship, and transmits an uplink signal according to the uplink pre-coding information. Therefore, a network device is not required to carry the uplink pre-coding information in a control signaling to send to the terminal device, and the signaling overhead may be reduced.

The terminal device 100 according to the implementation of the present application may refer to the terminal device 10 corresponding to the implementation of the present application, and various units/modules in the terminal device and the other operations and/or functions are respectively in order to realize the corresponding flow in the method 100, and will not be repeated here for brevity.

Figure 8:
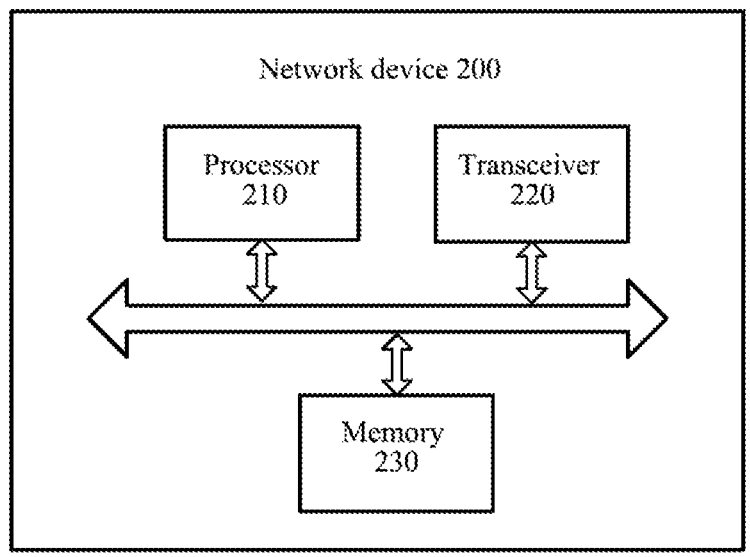
FIG. 8 is a schematic block diagram of a network device according to another implementation of the present application.

FIG. 8 shows a schematic block diagram of a network device according to another implementation of the present application, as shown in FIG. 8, a network device 200 includes a processor 210 and a transceiver 220, the processor 210 and the transceiver 220 are connected, and optionally, the network device 200 further includes a memory 230 connected to the processor 210. Herein, the processor 210, the memory 230, and the transceiver 220 may communicate with each other through an internal connection path. Herein, the transceiver 220 is used for sending a target downlink signal to a terminal device on a target downlink resource among a plurality of downlink resources. The transceiver 220 is further used for receiving an uplink signal sent by the terminal device according to the target uplink pre-coding information, wherein the target uplink pre-coding information is determined by the terminal device according to the target downlink resource and a predetermined corresponding relationship, and the predetermined corresponding relationship is a corresponding relationship between downlink resources and the uplink pre-coding information.

Therefore, after the network device according to the implementation of the present application sends a target downlink signal to a terminal device on a target downlink resource, the network device receives an uplink signal sent by the terminal device according to uplink pre-coding information. Since the uplink pre-coding information is determined by the terminal device according to the target downlink resource and a predetermined relationship, the network device is not required to carry the uplink pre-coding information in a control signaling to send to the terminal device, and the signaling overhead may be reduced.

The network device 200 according to the implementation of the present application may refer to the network device 20 corresponding to the implementation of the present application, and various units/modules in the network device and the other operations and/or functions are respectively in order to realize the corresponding flow in the method 200, and will not be repeated here for brevity.

It should be understood that the processor in the implementations of the present application may be an integrated circuit chip with a capability for processing signals. The above processor may be a general purpose processor, a digital signal processor (DSP), an application specific integrated circuit (ASIC), a field programmable gate array (FPGA), or other programmable logic device, a discrete gate or a transistor logic device, or a discrete hardware component. The processor may implement various methods, acts and logic block diagrams disclosed in the implementations of the present application. The general purpose processor may be a microprocessor, or the processor may be any conventional processor or the like.

It should be understood that the memory in the implementations of the present application may be a transitory memory or a non-transitory memory, or may include both transitory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be Random Access Memory (RAM) which serves as an external cache. By illustration of example but not restriction, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that memories in the systems and methods described herein are intended to include, but are not limited to, these and any other suitable types of memories.

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on specific applications and design constraints of the technical solutions. Skilled artisans may use different methods to implement the described functions in respect to each particular application, but such implementation should not be considered to be beyond the scope of the present application.

Those skilled in the art may clearly understand that for convenience and conciseness of description, specific working processes of the systems, apparatuses and units described above may refer to the corresponding processes in the method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus, or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the prior art, or the part of the technical solution, may be embodied in a form of a software product stored in a storage medium, including a number of instructions for causing a computer device (which may be a personal computer, a server, or a network device) to perform all or part of the acts of the method described in various implementations of the present application. The storage medium includes U disk, mobile hard disk, read-only memory (ROM), random access memory (RAM), magnetic disk or optical disk, and other medium capable of storing program codes.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be the protection scope defined by the claims.

The invention claimed is:

1. A method for transmitting an uplink signal, comprising:
   determining, by a terminal device, a target downlink resource for transmitting a target downlink signal among a plurality of downlink resources;
   determining, by the terminal device, target uplink pre-coding information according to the target downlink resource and a preset corresponding relationship, wherein the preset corresponding relationship is a corresponding relationship between downlink resources and uplink pre-coding information; and
   transmitting, by the terminal device, an uplink signal according to the target uplink pre-coding information;
   wherein the target uplink pre-coding information is used for indicating a target uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

2. The method according to claim 1, wherein the target uplink pre-coding information is used for indicating the target uplink wideband pre-coding matrix;
   wherein transmitting, by the terminal device, the uplink signal according to the target uplink pre-coding information comprises:
   performing, by the terminal device, a wideband pre-coding processing on the uplink signal according to the target uplink wideband pre-coding matrix to obtain a pre-coded uplink signal; and
   transmitting, by the terminal device, the pre-coded uplink signal.

3. The method according to claim 1, wherein the target uplink pre-coding information is used for indicating the target uplink beam; and
   transmitting, by the terminal device, the uplink signal according to the target uplink pre-coding information comprises:
   performing, by the terminal device, a beamforming processing on the uplink signal according to the target uplink beam to obtain a beamformed uplink signal; and
   transmitting, by the terminal device, the beamformed uplink signal.

4. The method according to claim 1, wherein the target uplink pre-coding information is used for indicating the target uplink sounding signal; and
   transmitting, by the terminal device, the uplink signal according to the target uplink pre-coding information, comprises:
   determining, by the terminal device, a beam used when transmitting the target uplink sounding signal as the target uplink beam;
   performing, by the terminal device, a beamforming processing on the uplink signal according to the target uplink beam to obtain a beamformed uplink signal; and
   transmitting, by the terminal device, the beamformed uplink signal.

5. The method according to claim 1, wherein the target uplink pre-coding information is used for indicating the target uplink sounding signal; and the method further comprises:
   before the terminal device determines the target downlink resource for transmitting the target downlink signal among the plurality of downlink resources:
   sending, by the terminal device, a plurality of uplink sounding signals to a network device, wherein the plurality of uplink sounding signals comprise the target uplink sounding signal, and the plurality of uplink sounding signals have a corresponding relationship with the plurality of downlink resources.

6. The method according to claim 1, wherein determining, by the terminal device, the target downlink resource for transmitting the target downlink signal among the plurality of downlink resources comprises:
   receiving, by the terminal device, resource configuration information sent by a network device, wherein the resource configuration information is used for indicating the target downlink resource;
   determining, by the terminal device, the target downlink resource according to the resource configuration information; or,
   determining, by the terminal device, a downlink resource where the target downlink signal is detected among the plurality of downlink resources as the target downlink resource.

7. The method according to claim 1, wherein the target downlink signal is one of the following signals: a downlink control channel, a downlink random access response signal, a downlink data channel, and a downlink reference signal.

8. A terminal device, comprising a processor and a transceiver, wherein,
   the processor is used for determining a target downlink resource for transmitting a target downlink signal among a plurality of downlink resources;
   wherein the processor is further used for determining target uplink pre-coding information according to the target downlink resource and a preset corresponding relationship, wherein the preset corresponding relationship is a corresponding relationship between downlink resources and uplink pre-coding information; and
   the transceiver is used for transmitting an uplink signal according to the target uplink pre-coding informatiom;
   wherein the target uplink pre-coding information is used for indicating a target uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

9. The terminal device according to claim 8, wherein the target uplink pre-coding information is used for indicating the target uplink wideband pre-coding matrix;
   the processor is further used for performing a wideband pre-coding processing on the uplink signal according to the target uplink wideband pre-coding matrix to obtain a pre-coded uplink signal; and
   the transceiver is specifically used for transmitting the pre-coded uplink signal.

10. The terminal device according to claim 8, wherein the target uplink pre-coding information is used for indicating the target uplink beam;
    wherein the processor is further used for performing a beamforming processing on the uplink signal according to the target uplink beam to obtain a beamformed uplink signal; and
    the transceiver is specifically used for transmitting the beamformed uplink signal.

11. The terminal device according to claim 8, wherein the target uplink pre-coding information is used for indicating the target uplink sounding signal;
- wherein the processor is further used for determining a beam used when transmitting the target uplink sounding signal as the target uplink beam; and
- performing a beamforming processing on the uplink signal according to the target uplink beam to obtain a beamformed uplink signal; and
- the transceiver is specifically used for transmitting the beamformed uplink signal.

12. The terminal device according to claim 8, wherein the target uplink pre-coding information is used for indicating the target uplink sounding signal; and
- wherein before the processor determines the target downlink resource for transmitting the target downlink signal among the plurality of downlink resources,
- the transceiver is further used for:
- sending a plurality of uplink sounding signals to a network device, wherein the plurality of uplink sounding signals comprise the target uplink sounding signal, and the plurality of uplink sounding signals have a corresponding relationship with the plurality of downlink resources.

13. The terminal device according to claim 8, wherein the transceiver is further used for:
- receiving resource configuration information sent by a network device, wherein the resource configuration information is used for indicating the target downlink resource; and one of:
- the processor is specifically used for determining the target downlink resource according to the resource configuration information; or,
- the processor is specifically used for determining a downlink resource where the target downlink signal is detected among the plurality of downlink resources as the target downlink resource.

14. The terminal device according to claim 8, wherein the target downlink signal is one of the following signals: a downlink control channel, a downlink random access response signal, a downlink data channel, and a downlink reference signal.

15. A network device, comprising a processor and a transceiver, wherein,
- the transceiver is used for sending a target downlink signal to a terminal device on a target downlink resource among a plurality of downlink resources; and
- the transceiver is further used for receiving an uplink signal sent by the terminal device according to target uplink pre-coding information, wherein the target uplink pre-coding information is determined by the terminal device according to the target downlink resource and a preset corresponding relationship, and the preset corresponding relationship is a corresponding relationship between downlink resources and uplink pre-coding information;
- wherein the target uplink pre-coding information is used for indicating an uplink wideband pre-coding matrix; or, the target uplink pre-coding information is used for indicating a target uplink beam; or, the target uplink pre-coding information is used for indicating a target uplink sounding signal, and the target uplink sounding signal is used for the terminal device to determine a target uplink wideband pre-coding matrix or a target uplink beam.

16. The network device according to claim 15, wherein the target uplink pre-coding information is used for indicating a target uplink sounding signal, and the transceiver is further used for:
- receiving a plurality of uplink sounding signals sent by the terminal device, wherein the plurality of uplink sounding signals comprise the target uplink sounding signal, and the plurality of uplink sounding signals have a corresponding relationship with the plurality of downlink resources;
- the processor is used for determining the target uplink sounding signal; and
- the processor is further used for determining the target downlink resource according to the target uplink sounding signal.

17. The network device according to claim 15, wherein the transceiver is further used for:
- sending resource configuration information to the terminal device, wherein the resource configuration information is used for indicating the target downlink resource.

* * * * *